(12) United States Patent
Riise et al.

(10) Patent No.: US 9,296,127 B2
(45) Date of Patent: Mar. 29, 2016

(54) PROCESSES AND REQUIREMENTS FOR THE RECOVERY OF PLASTICS FROM DURABLE GOODS

(71) Applicant: MBA Polymers, Inc., Notthinghamshire (GB)

(72) Inventors: Brian L. Riise, San Ramon, CA (US); Arthur Schwesig, Wolfpassing (AT)

(73) Assignee: MBA Polymers, Inc., Notthinghamshire (GB)

( * ) Notice: Subject to any disclaimer, the term of this patent is extended or adjusted under 35 U.S.C. 154(b) by 136 days.

(21) Appl. No.: 14/183,760

(22) Filed: Feb. 19, 2014

(65) Prior Publication Data

US 2014/0231557 A1    Aug. 21, 2014

Related U.S. Application Data

(60) Provisional application No. 61/766,248, filed on Feb. 19, 2013.

(51) Int. Cl.
*B02C 23/00* (2006.01)
*B29B 17/02* (2006.01)
(Continued)

(52) U.S. Cl.
CPC ............... *B29B 17/02* (2013.01); *B02C 19/00* (2013.01); *B02C 19/0056* (2013.01); *B02C 23/00* (2013.01); *B03B 9/061* (2013.01); *B07C 5/346* (2013.01); *B03B 2009/068* (2013.01); *B29B 17/04* (2013.01); *B29B 17/0412* (2013.01); *B29B 2017/0015* (2013.01); *B29B 2017/0203* (2013.01); *B29B 2017/0244* (2013.01); *B29B 2017/0248* (2013.01); *B29B 2017/0265* (2013.01); *B29B 2017/0272* (2013.01); *B29B 2017/0279* (2013.01); *B29K 2021/00* (2013.01); *B29K 2023/06* (2013.01); *B29K 2023/12* (2013.01); *B29K 2025/06* (2013.01); *B29K 2027/06* (2013.01); *B29K 2055/02* (2013.01); *B29K 2067/00* (2013.01);
(Continued)

(58) Field of Classification Search
CPC    B02C 19/0062; B02C 19/00; B02C 19/0093; B02C 23/00; B29B 17/02; B29B 17/04; B29B 2017/0203; B02B 9/061; Y02W 30/62; Y02W 30/524; Y02W 30/625; Y02W 30/68; B29K 17/04; B29K 2067/00
USPC ................ 241/20, 24.18, 24.28; 209/3
See application file for complete search history.

(56) References Cited

U.S. PATENT DOCUMENTS 5,992,335 A * 11/1999 Nakamura .......... B29B 17/0026
                                                           110/342
6,007,005 A * 12/1999 Gonzales .................. B03B 5/30
                                                           241/20
(Continued)

FOREIGN PATENT DOCUMENTS

WO    WO2005123817 A1    12/2005

OTHER PUBLICATIONS

International Search Report in PCT/US2014/017152, mailed Jul. 7, 2014, 19 pages.

*Primary Examiner* — Faye Francis
(74) *Attorney, Agent, or Firm* — Fish & Richardson P.C.

(57) ABSTRACT

A process for the recovery of a plastic product from ASR or ESR mixtures can include five or more process steps selected from DEXRT; XRF; size reduction; density separation; NIR sorting; Electrostatic separation; LD sorting; Wood removal; rubber removal; metal removal; and glass removal.

4 Claims, 7 Drawing Sheets

(51) Int. Cl.
    *B02C 19/00*     (2006.01)
    *B03B 9/06*     (2006.01)
    *B07C 5/346*     (2006.01)
    *B29B 17/04*     (2006.01)
    *B29K 21/00*     (2006.01)
    *B29K 23/00*     (2006.01)
    *B29K 25/00*     (2006.01)
    *B29K 27/06*     (2006.01)
    *B29K 55/02*     (2006.01)
    *B29K 67/00*     (2006.01)
    *B29K 69/00*     (2006.01)
    *B29K 77/00*     (2006.01)
    *B29K 105/00*     (2006.01)
    *B29B 17/00*     (2006.01)
    *B29K 705/00*     (2006.01)
    *B29L 31/30*     (2006.01)

(52) U.S. Cl.
    CPC ........ *B29K 2069/00* (2013.01); *B29K 2077/00* (2013.01); *B29K 2105/0026* (2013.01); *B29K 2705/00* (2013.01); *B29L 2031/3055* (2013.01); *Y02W 30/521* (2015.05); *Y02W 30/524* (2015.05); *Y02W 30/526* (2015.05); *Y02W 30/527* (2015.05); *Y02W 30/622* (2015.05); *Y02W 30/625* (2015.05); *Y02W 30/68* (2015.05)

(56) References Cited

U.S. PATENT DOCUMENTS

| | | | |
|---|---|---|---|
| 6,335,376 B1 | 1/2002 | Allen | |
| 6,599,950 B2 | 7/2003 | Jody | |
| 7,503,513 B2 * | 3/2009 | Simon | B03B 9/061 241/19 |
| 7,802,685 B2 | 9/2010 | Allen | |
| 7,884,140 B2 | 2/2011 | Riise | |
| 8,056,728 B2 | 11/2011 | Riise | |
| 8,302,777 B2 | 11/2012 | Riise | |
| 8,322,639 B2 * | 12/2012 | Gitschel | B02C 23/08 241/19 |
| 2007/0054106 A1 * | 3/2007 | Armstrong | B03B 9/061 428/304.4 |
| 2008/0257794 A1 | 10/2008 | Valerio | |
| 2009/0065404 A1 * | 3/2009 | Paspek, Jr. | B03B 5/28 209/173 |
| 2012/0248014 A1 | 10/2012 | Riise | |
| 2013/0008831 A1 | 1/2013 | Riise | |
| 2013/0092770 A1 * | 4/2013 | Gitschel | B02C 23/08 241/24.13 |

* cited by examiner

PROCESSES AND REQUIREMENTS FOR THE RECOVERY OF PLASTICS FROM DURABLE GOODS

CROSS REFERENCE TO RELATED APPLICATIONS

This application claims the benefit of priority under 35 U.S.C. §119(e) to U.S. Application No. 61/766,248 filed Feb. 19, 2013. The prior application is incorporated herein by reference in its entirety.

TECHNICAL FIELD

This disclosure relates to material separations, including recycling plastics from streams of waste plastics and other materials.

BACKGROUND

Products made from or incorporating plastic are used in almost any work place or home environment. Generally, the plastics that are used to create these products are formed from virgin plastic materials. That is, the plastics are produced from petroleum and are not made from existing plastic materials. Once the products have outlived their useful lives, they are generally sent to waste disposal or a recycling plant.

Recycling plastic has a variety of benefits over creating virgin plastic from petroleum. Generally, less energy is required to manufacture an article from recycled plastic materials derived from post-consumer and post-industrial waste materials and plastic scrap (collectively referred to in this specification as "waste plastic material"), than from the comparable virgin plastic. Recycling plastic materials obviates the need for disposing of the plastic materials or product. Further, less of the earth's limited resources, such as petroleum and polymers, are used to form virgin plastic materials.

When plastic materials are sent to be recycled, the feed streams rich in one or more plastic materials may be separated into multiple product and byproduct streams. Generally, the recycling processes can be applied to a variety of plastics-rich streams derived from post-industrial and post-consumer sources. These streams may include, for example, plastics from office automation equipment (printers, computers, copiers, etc.), white goods (refrigerators, washing machines, etc.), consumer electronics (televisions, video cassette recorders, stereos, etc.), small domestic appliances (coffee makers, electric kettles, rice cookers, etc.), automotive shredder residue (ASR, the mixed materials remaining after most of the metals have been sorted from shredded automobiles and other metal-rich products "shredded" by metal recyclers), electronics shredder residue (ESR, the mixed materials remaining after most of the metals have been sorted from electronics "shredded" by metal recyclers), packaging waste, household waste, building waste and industrial molding and extrusion scrap.

Different types of plastic parts are often processed into shredded plastic-rich streams. The variety of parts can vary from a single type of part from a single manufacturer up to multiple families of part types. Many variations exist, depending on at least the nature of the shredding operation. Plastics from more than one source of durable goods may be included in the mix of materials fed to a plastics recycling plant. This means that a very broad range of plastics may be included in the feed mixture. Some of the prevalent polymer types in the waste plastic materials derived from the recycling of end-of-life durable goods are acrylonitrile-butadiene-styrene (ABS), high impact polystyrene (HIPS), polypropylene (PP), polyethylene (PE), polycarbonate (PC), and blends of PC with ABS (PC/ABS), polyamides (PA), polymethyl methacrylate (PMMA), polyvinyl chloride (PCV), polyether ether ketone (PEEK), polysulfone (PSU), polyoxymethylene (POM) and others. In some cases, the polymer pieces contain flame retardants or fillers.

Mixtures of recycled plastic materials can also contain rubber, wood, thermosets and other non-plastic materials.

In order to create product streams suitable for the widest range of applications, it is desirable to purify the flakes such that they contain almost entirely one type of plastic and almost no non-plastic materials.

In the following, methods are described for separating the plastic flakes into streams that are suitable for re-use.

SUMMARY

This application provides methods for recovering plastic flake streams from durable goods.

DETAILED DESCRIPTION

Figure 1:
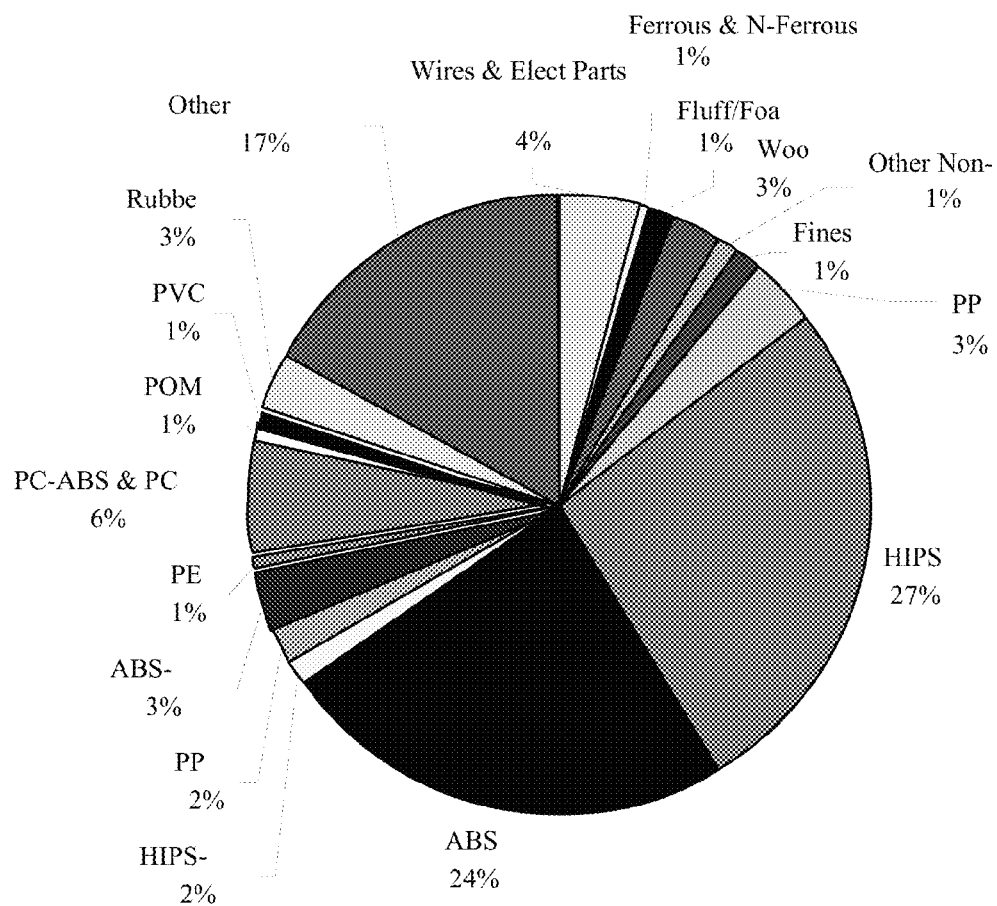
FIG. 1 depicts a typical composition of an upgraded stream of Electronics Shredder Residue (ESR).

This application describes methods for purifying plastic from durable-goods waste streams. In some cases, the purification can include removal of undesirable plastics and non-plastics from a stream of a single plastic type. In some cases, the purification can include removal of undesirable plastics and non-plastics from a stream of a family of two or more plastic types.

Accordingly, in the following, methods, systems and devices are provided herein for the purification of streams primarily containing one or more desired plastic types.

A recycling plant for the recovery of plastics from durable goods typically includes a number of process steps. For example, U.S. Pat. No. 7,802,685 describes various sequences of various process steps for the removal of non-plastics and the separation of the various plastic types from streams containing mixtures of plastics from durable goods. The methods, systems, and devices provided herein can be used in sequence with or in substitution for the various process steps described in U.S. Pat. No. 7,802,685, which is hereby incorporated by reference and attached as Appendix A. These sequences of processes apply to both streams derived from durable goods and to streams of packaging materials, bottles or other mixtures rich in plastics. The process can include the use of one or more size reduction steps performed on a plastics-rich mixture from durable goods. The feed mixture can be shredded material from which some metal has been removed. The durable goods themselves can be size reduced two or more times prior to extrusion.

The recycling plant described in U.S. Pat. No. 7,802,685 primarily focuses on the recovery of ABS, HIPS and PP. In addition, some compositions of these recovered plastics are described in U.S. Pat. No. 7,884,140. While these plastics are typically the most prevalent in streams of durable goods, the recovery of some of the other plastics can be of value. Strategies to recover these other plastics are thus provided herein.

Compositional Requirements

To understand processing methods, it is important to first describe the compositions of the plastics from durable goods and the properties that are suitable for marketing the streams of purified or mixed plastics.

Some of the most important requirements of the recovered plastics are regulatory requirements related to substances of concern in the plastics. In the past, substances such as brominated flame retardants (BFRs), heavy metals, chlorine-based flame retardants and phthalates were used to control the flammability, color or flexibility of polymers. In recent years, however, these substances are less desirable and in some cases restricted from use in plastics. These substances remain in some of the plastics recovered from durable goods, though, so the plastics can be separated to ensure that these substances do not occur above certain levels in products.

Only a few particular BFRs are restricted from use in certain countries. Polybrominated diphenyl ethers (PBDEs) are restricted by the RoHS Directive in Europe (2002/95/EC), for example. Since it is not easy to distinguish PBDEs from other BFRs, and since many manufacturers of Electrical and Electronic equipment are global companies, many of these companies limit the total bromine content in plastics used in their products to low levels. Many use 1000 parts per million (0.1 weight percent) of bromine as the limit as this is the limit for PBDEs, though standards such as the Electronic Product Environmental Assessment Tool (EPEAT) allow for up to 3000 parts per million of bromine to allow for more recycling. This is because only a fraction of the BFRs in waste plastics are PBDEs.

The RohS Directive (2002/95/EC) also includes limits of 100 parts per million (by weight) for cadmium and 1000 parts per million (by weight) each for lead, chromium (VI) and mercury. These limits are also often applied to applications not covered by the RoHS Directive.

Some customers may additionally limits the concentrations of other substances in plastics. Such substances can include chlorine and phthalates, for example.

Methods are available to control the concentrations of BFRs and heavy metals in recycled plastics recovered from durable goods. U.S. Pat. No. 7,802,685 and U.S. Patent Publication No. 2013-0008831 describe methods for reducing the levels of BFRs in recycled plastic products, which are hereby incorporated by reference. U.S. Pat. No. 8,302,777 covers methods for reducing the content of heavy metals in recycled plastics.

Another requirement of the recovered plastics is that it should contain low levels of non-melting contaminants. As the recovered plastics will likely be processed in the melt state using processes such as injection molding or extrusion, the presence of non-melting contaminants such as rubber, wood, other thermosets or metals could result in problems in melt processing or in the quality of finished articles. The allowable levels of such non-melt contaminants will depend on the type and size of the contaminant as well as the type of melt processing. In some cases, the levels of non-melt contaminants can be limited to less than 1 percent (by weight) and preferably less than 0.1 percent (by weight). U.S. Pat. No. 7,802, 685, U.S. Pat. No. 8,056,728 and U.S. Patent Publication No. 2012-0248014 describe methods for removing such non-melt contaminants. These methods include processes prior to melt processing as well as melt filtration during extrusion.

Each type of recovered plastic mixture may additionally be subject to requirements related to the mixture of grades in the plastic, the allowable levels of other plastics in the mixture, and the allowable levels of residual additives (including those from other plastics) in the mixture. Example levels are summarized in Table 1 and described below.

Polycarbonate (PC) should be reasonably compatible with other grades of PC, including grades containing additives or fillers. Contaminant polymers in PC will reduce the mechanical properties, although PC/ABS blends (including FR grades) and ABS (non-FR) should have only minimal negative effects on the properties. Levels of up to 20% PC/ABS or up to 10% ABS (non-FR) may be acceptable as associated property reductions may not greatly diminish the marketability of the PC. Other plastics may more dramatically harm the properties of the PC, though, so other plastics may be limited to levels of up to about 2 percent (by weight). As PC is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight) and PVC can be below 0.1 percent (by weight).

PC/ABS blends should be reasonably compatible with other grades of PC/ABS, including flame retardant grades. Contaminant polymers in PC/ABS (or FR grades of PC/ABS) can reduce the mechanical properties, although PC and ABS (non-FR) should have only minimal negative effects on the properties. In some cases, levels of up to 20% PC or up to 20% ABS (non-FR) can be acceptable as any associated property reductions may not greatly diminish the marketability of the PC/ABS. Other plastics may more dramatically harm the properties of the PC/ABS, though, so other plastics can be limited to levels of up to about 2 percent (by weight). As the PC in PC/ABS is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight) and PVC can be below 0.1 percent (by weight).

Polyamides including PA6, PA66 and PA12 are found in plastics recovered from durable goods. The different types of polyamides are incompatible with each other, although small amounts (up to 5 percent by weight) of PA66 in PA6 or PA6 in PA66 can be acceptable in that any property reductions may not greatly diminish the marketability. Other plastics may more dramatically harm the properties of the PA6 or PA66, though, so other plastics can be limited to be present at levels up to about 2 percent (by weight). As PA is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight) and PVC can be below 0.1 percent (by weight).

Flame Retardant ABS (ABS-FR) can also be recycled from a technical standpoint, although restrictions on PBDEs such as octabromodiphenyl ether (a BFR sometimes used in ABS-FR in the past) may prevent its sale in some locations. If such restrictions are not in place or if the ABS-FR can be shown not to contain restricted BFRs (tetrabromobisphenol A, which is most commonly used in ABS-FR, is not currently restricted), the ABS-FR should be compatible in all proportions with other grades of ABS-FR and with non-FR grades of ABS or styrene acrylonitrile copolymer (SAN). To avoid reducing the properties significantly, the ABS-FR can contain less than about 5 percent (by weight) HIPS (including HIPS-FR) and no more than 2 percent (by weight) of other plastics. Plastics that can degrade in the presence the BFRs and $Sb_2O_3$ in ABS-FR, including PC, PC/ABS and PA, can be limited to levels below about 1 percent (by weight). PVC, which degrades (giving off HCl) at the temperatures used for extrusion or injection molding of ABS-FR, can be limited to levels of about 1 percent (by weight) or less.

Flame Retardant HIPS (HIPS-FR) can also be recycled from a technical standpoint, although restrictions on PBDEs such as decabromodiphenyl ether (a BFR commonly used in HIPS-FR in the past) may prevent its sale in some locations. If such restrictions are not in place or if the HIPS-FR can be shown not to contain restricted BFRs, the HIPS-FR should be compatible in all proportions with other grades of HIPS-FR, with non-FR grades of HIPS and with blends of polyphenylene ether and HIPS (PPO/HIPS). To avoid reducing the properties significantly, the HIPS-FR can contain less than about 5 percent (by weight) ABS (including ABS-FR) and no more than 2 percent (by weight) of other plastics. Plastics that can degrade in the presence the BFRs and $Sb_2O_3$ in HIPS-FR, including PC, PC/ABS and PA, can be present at levels below about 1 percent (by weight). PVC, which degrades (giving off HCl) at the temperatures used for extrusion or injection molding of HIPS-FR, can be limited to levels of about 1 percent (by weight) or less.

Filled polypropylene (FPP) grades can also be found in streams from durable goods. FPP grades containing 10 or 20 percent (by weight) talc or calcium carbonate fillers have densities of approximately 0.99 and 1.06, respectively, so are found in mixtures of ABS and HIPS or with unfilled PP and PE. FPP grades containing 30 or 40 percent (be weight) of talc or calcium carbonate, or FPP containing glass fillers, tend to have densities greater than about 1.1, though, so they can be found in mixtures along with PC/ABS, PC, PA, ABS-FR, HIPS-FR and other high density plastics. For such highly filled PP grades to achieve marketable properties, they can be mixed with other grades of FPP or unfilled PP in all proportions. As PP is to some extent compatible with PE, up to about 10 percent (by weight) PE can be found in FPP. HIPS can be compatibilized into PP reasonably well, so up to about 5 percent (by weight) can be included in FPP. Other plastics can be limited to levels of about 2 percent (by weight) or less. PVC, which degrades (giving off HCl) at the temperatures used for extrusion or injection molding of FPP, can be limited to levels of about 1 percent (by weight) or less.

PPO/HIPS blends are compatible with other grades and with HIPS or PS (general purpose polystyrene without impact modifiers). Some filled grades of PPO/HIPS (glass filled grades, for example) may not retain their properties when recycled, but should be compatible with unfilled grades. To avoid reducing the properties significantly, the PPO/HIPS can contain less than about 5 percent (by weight) ABS (including ABS-FR) and no more than 2 percent (by weight) of other plastics. PVC, which degrades (giving off HCl) at the temperatures used for extrusion or injection molding of PPO/HIPS, can be limited to levels of about 1 percent (by weight) or less.

PVC should be compatible with other PVC grades and PVC/ABS blends. Because of the compatibility with ABS, it is possible to have up to about 20 percent (by weight) ABS or ABS-FR in the PVC product. Other plastics can be limited to be less than about 2 percent (by weight). Higher melting (or processing temperature) plastics and plastics that are subject to hydrolytic degradation can be limited to very low levels such as 0.1 percent (by weight) or less. These plastics include PC, PC/ABS, PET, PBT, PC/PBT, POM, PPO/HIPS and PA.

Polymethyl methacrylate (PMMA) should be compatible with other PMMA grades. Other plastics can be limited to be less than about 2 percent (by weight).

Polyether ether ketone (PEEK) should be compatible with other PEEK grades. PEEK is processed at high temperatures, so other plastics can be limited to be less than about 1 percent (by weight) to minimize the effects of degradation of the plastics. PVC, which degrades (giving off HCl) at the temperatures used for extrusion or injection molding of PEEK, can be limited to levels of about 0.01% percent (by weight) or less.

Polysulfone (PSU) should be compatible with other PSU grades. PSU is processed at high temperatures, so other plastics can be limited to be less than about 1 percent (by weight) to minimize the effects of degradation of the plastics.

Polyoxymethylene (POM) includes polyacetal homopolymers and copolymers. The homopolymer grades are compatible with each other and the copolymer grades are compatible with each other, and homopolymers and copolymers are reasonably compatible. Other plastics may more dramatically harm the properties of the POM, though, so most other plastics can be limited to levels of up to about 2 percent (by weight). As POM is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight). As PVC degradation is particular problematic for POM, PVC can be below 0.01 percent (by weight).

Polybutylene terephthalate (PBT) is compatible with other PBT grades. PBT can tolerate some amounts of PC/PBT and PC, with up to about 20 percent by weight of PC/PBT and up to about 10 percent by weight of PC. Other plastics may more dramatically harm the properties of the PBT, though, so other plastics can be limited to levels of up to about 2 percent (by weight). As PBT is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight) and PVC can be below 0.1 percent (by weight).

PC/PBT blends are compatible with other PC/PBT grades. PC/PBT can tolerate some amounts of PBT and PC, with up to about 20 percent by weight of each. Other plastics may more dramatically harm the properties of the PBT, though, so most other plastics can be limited to levels of up to about 2 percent (by weight). As PBT is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight) and PVC can be below 0.1 percent (by weight).

Polyethylene terephthalate (PET) is compatible with other PET grades. PET can tolerate up to about 10 percent by weight of PET/ABS. Other plastics may more dramatically harm the properties of the PET, though, so other plastics can be limited to levels of up to about 2 percent (by weight). As PET is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight) and PVC can be below 0.1 percent (by weight).

PET/ABS blends are compatible with other PET/ABS grades. PET/ABS can tolerate up to about 10 percent by weight of PET and up to about 10 percent by weight ABS (non-FR). Other plastics may more dramatically harm the properties of the PET/ABS, though, so other plastics can be limited to levels of up to about 2 percent (by weight). As PET in PET/ABS is subject to hydrolytic degradation during melt processing, contaminants such as BFRs and $Sb_2O_3$ (as found in ABS-FR and HIPS-FR), PVC and PUR paint can be limited to trace levels. In some cases, the combined amount of ABS-FR and HIPS-FR can be below 1 percent (by weight) and PVC can be below 0.1 percent (by weight).

TABLE 1

Allowable Compositions for Additional Plastics Recovered from Streams of Durable Goods

| Type of Plastic | Compatibility of other grades | Allowable levels of other plastics | Sensitivity to Additives or contaminants |
|---|---|---|---|
| Polycarbonate (PC) | compatible | <20% PC/ABS (including FR grades)<br><10% ABS (non-FR)<br><1% ABS-FR and HIPS-FR<br><0.1% PVC<br><2% other plastics | BFRs and $Sb_2O_3$<br>PUR paint |
| PC/ABS blends | FR and non-FR grades are compatible | <20% PC<br><20% ABS (non-FR)<br><1% ABS-FR and HIPS-FR<br><0.1% PVC<br><2% other plastics | BFRs and $Sb_2O_3$<br>PUR paint |
| Polyamides (PA) | Different polyamides (e.g. PA6 and PA66) are incompatible | <5% PA66 in PA6 or PA6 in PA66<br><1% ABS-FR and HIPS-FR<br><0.1% PVC<br><2% other plastics | BFRs and $Sb_2O_3$<br>PUR paint |
| ABS-FR | compatible (including non-FR grades) | <5% HIPS (inc. HIPS-FR)<br><1% PC<br><1% PC/ABS<br><1% PA<br><1% PVC<br><2% other plastics | PUR paint |
| HIPS-FR | compatible (including non-FR grades and PPO/HIPS blends) | <5% ABS (inc. ABS-FR)<br><1% PC<br><1% PC/ABS<br><1% PA<br><1% PVC<br><2% other plastics | PUR paint |
| Filled PP (FPP) | Compatible with unfilled PP and with other filled and flame retardant PP grades | <20% PE<br><5% HIPS<br><1% PVC<br><2% other plastics | PUR paint |
| PPO/HIPS | Compatible with other PPO/HIPS grades, HIPS and PS | <5% ABS (inc. ABS-FR)<br><1% PVC<br><2% other plastics | PUR paint |
| PVC | Compatible with all PVC and PVC/ABS grades | <20% ABS (inc. ABS-FR)<br><0.1% PC, PC/ABS, PET, PBT, PC/PBT, POM, PPE/HIPS, and PA<br><0.01% POM<br><2% other plastics | PUR paint |
| Polymethyl methacrylate (PMMA) | Compatible with PMMA grades | <2% other plastics | |
| Polyether ether ketone (PEEK) | Compatible with PEEK grades | <0.01% PVC<br><1% other plastics | paint |
| Polysulfone (PSU) | Compatible with PSU grades | <1% other plastics | paint |
| Polyoxymethylene (POM) | Somewhat compatible with various POM grades | <0.01% PVC<br><1% ABS-FR and HIPS-FR<br><2% other plastics | BFRs and $Sb_2O_3$<br>PUR paint |
| Polybutylene terephthalate (PBT) | Compatible with PBT grades | <20% PC/PBT<br><10% PC (non-FR)<br><1% ABS-FR and HIPS-FR<br><0.1% PVC<br><2% other plastics | BFRs and $Sb_2O_3$<br>PUR paint |
| PC/PBT blends | Compatible with PC/PBT grades | <20% PC<br><20% PBT<br><1% ABS-FR and HIPS-FR<br><0.1% PVC<br><2% other plastics | BFRs and $Sb_2O_3$<br>PUR paint |

TABLE 1-continued

Allowable Compositions for Additional Plastics Recovered from Streams of Durable Goods

| Type of Plastic | Compatibility of other grades | Allowable levels of other plastics | Sensitivity to Additives or contaminants |
|---|---|---|---|
| Polyethylene terephthalate (PET) | Compatible with PET grades | <10% PET/ABS<br><1% ABS-FR and HIPS-FR<br><0.1% PVC<br><2% other plastics | BFRs and $Sb_2O_3$<br>PUR paint |
| PET/ABS blends | Compatible with PET/ABS blends | <10% ABS (non-FR)<br><10% PET<br><1% ABS-FR and HIPS-FR<br><0.1% PVC<br><2% other plastics | BFRs and $Sb_2O_3$<br>PUR paint |

The recovered plastics may include additives to recover their properties, to limit the effects of some of the contaminants, and to stabilize them against degradation.

While it is desirable to recover the plastic streams at the compositions described in Table 1, it is also possible to recover streams of mixed plastics that can be used in lower value ("downcycled") applications. Such applications may require the same low levels of substances of concern such as BFRs, heavy metals and phthalates. An allowable concentration of non-melts such as rubber, wood and thermosets will depend on the production method and product requirements.

In cases where mixed plastic streams are used for energy recovery or as raw materials in a process turning the mixed plastics into liquid fuels, the requirements of the mixture will depend on the technique used. In some cases, there may be limits on sulfur, chlorine, heavy metals, BFRs or phosphorous.

Processes for Recovering Additional Plastics

A number of separation processes can be used to recover plastics in compositions described in the previous section. Typically, several of these process steps may be used. Table 2 lists the type of process, the purpose, the particle size range for the process and limitations of the process.

TABLE 2

Processes used to recover Plastics from Streams of Durable Goods

| Process | Purpose | Particle Size | Limitations |
|---|---|---|---|
| density | Create stream enriched in the targeted plastic(s) | Depends on detailed method | Density overlap of 2 or more plastics |
| Electrostatic separation | Separate plastics that charge differently | <8-10 mm | Inefficient for mixtures with >2 components<br>Charge overlap of some plastic types<br>Difficult to achieve desired purities for complex mixtures |
| DEXRT | Remove BrFR plastics, metals and glass | >8-10 mm | Inefficient for smaller particles<br>Unable to identify all BFR flakes<br>Loss of some target plastics |
| XRF | Remove BrFR plastics and/or plastics containing heavy metals | Large particles | Cannot differentiate plastic types (except for certain special cases such as PVC) |
| NIR | Can distinguish light colored materials by type | | Only works for light colored flakes, so overall yield efficiency is low for WEEE |
| LD | Can distinguish light and dark pigmented materials by type | <10 mm | Only good to purify highly enriched streams |
| Color sort | Remove flakes containing heavy metals<br>May be used in conjunction with XRF sort or NIR | Depends on sorter type | Unable to distinguish plastics by type (unless combined with NIR detectors) |
| Density Differential Alteration | Hydroscopic materials "foam" above their $T_g$, so density is reduced | <8-10 mm | No commercially available equipment |
| Froth Flotation | Differences in hydrophobicity can enable separation of plastics with density overlap | <8-10 mm | Patents owned by Argonne (and no known commercial use of the technology) for plastics) |

Density separation is a useful method for the recovery plastics, as many plastics have different densities. Examples of plastic types and their densities include:

PP: 0.91-0.94

HDPE: 0.93-0.97

FPP (10% talc or calcium carbonate filler): 0.99
FPP (20% talc or calcium carbonate filler): 1.06
FPP (30% talc or calcium carbonate filler): 1.15
FPP (40% talc or calcium carbonate filler): 1.25
ABS: 1.05-1.10
HIPS: 1.04-1.06
PPE/HIPS: 1.06-1.12
PA12: 1.01-1.03
PA6: 1.14
PA66: 1.14
PMMA: 1.18
PC: 1.20-1.22
PC/ABS: 1.12-1.20
ABS-FR: 1.15 (UL 94 V-2 rating) or 1.18-1.23 (UL 94 V-0 rating)
HIPS-FR: 1.07-1.12 (UL 94 V-2 rating) or 1.14-1.17 (UL 94 V-0 rating)
PVC: 1.3-1.4
PEEK: 1.32
PSU: 1.23-1.36
POM: 1.4
PBT: 1.3
PC/PBT: 1.2-1.3
PET: 1.18
PET/ABS: 1.12

It is possible to separate plastics as long as there is some density difference, but many plastics have similar densities or broad density distributions that prevent density separation from leading to high purity plastic products. It therefore can be useful to use additional separation types to recover plastics at the compositions summarized in Table 1.

Electrostatic sorting is a method that can separate plastics based on how they charge against each other. This method is typically used on particles smaller than about 10 mm, as larger particles do not deflect very much under the influence of reasonably achievable electric fields. One of the disadvantages of the method is that it does not work very well for mixtures with more than two components, and many of the plastic mixtures from durable goods streams contain more than two components. Electrostatic sorting can be a useful separation method when used in combination with other methods.

Sorting based on the transmission of X-rays, and especially dual energy X-ray transmission (DEXRT) is a useful method for segregating some types of plastics from others. DEXRT can distinguish most plastics containing BFRs from other plastics due to the high electron density of Br. Most BFR plastics can therefore be separated from plastics not containing BFRs. DEXRT can also sort out other high density components such as metals and glass. In some cases, DEXRT can be used on a stream having an average piece size of larger than 10 mm. For example, DEXRT can be used early in the overall separation process when the vast majority of plastic pieces are larger than about 10 mm. In some cases, DEXRT may not detect particles much smaller than about 10 mm (actual size limitation depends on the details of the sorting equipment). In some cases, DEXRT may not always distinguish pieces that do contain BFRs from pieces that do not. These misses as well as some ejection of plastics not containing BFRs means the separation is incomplete. Some of this can be remedied by multiple passes or re-running of ejected streams, though other processes may be used to ensure adequate separations.

Sorting based on X-ray fluorescence (XRF) has some of the same characteristics as DEXRT sorting, though XRF sorting has the advantage of better sensitivity to the element of interest. When Br is the element of interest, it is straightforward to eject the BFR plastic without also ejecting other dense materials (other than false ejections due to larger than required coverage of air blasts used for ejection).

Sorting based on reflected near-infrared (NIR) radiation is another method to distinguish different types of plastics. NIR cannot identify darkly pigmented or black plastics, so NIR sorting is unable to sort a large portion of the plastics found in durable goods streams. In addition, multiple passes of sorting and re-sorting can be used to achieve the desired purities of the recovered plastics. NIR sorting can be a part of the solution to recovering additional plastics from waste durable goods, though other methods can be used to recover the dark plastics.

Some types of sensors are able to distinguish plastic types regardless of their pigmentation, so can be used to separate and recover a variety of plastics. Sorting based on the use of high speed laser spectroscopy is such a method. Each type of material may give a distinct spectral signature such that flakes not matching the spectra of the desired flake are ejected in a sorter. Such sorting equipment is available from Unisensor Sensorsysteme GmbH (Karlsruhe, Germany). Due to some inefficiencies in the sorting process, multiple passes may be used to use such equipment for the recovery of purified products, or the equipment may be used in combination with other separation processes.

Some types of sensors may also be able to distinguish the types of additives in plastics, including an ability to distinguish plastics containing restricted BFRs from those containing unrestricted BFRs. Sorting equipment using such sensors may be implemented as part of the separation process, though other equipment can be used to achieve the desired product purities.

Color sorting may also be used as a method to facilitate the recovery of plastics from durable goods streams. While color sorting alone cannot be used to create purified products, it could be used to create a stream of light colored flakes that can be sorted using NIR. Color sorting can also be used to reduce the content of heavy metals, as described in U.S. Pat. No. 8,302,777.

Density Differential Alteration is a method to facilitate the separation of plastics of similar density and is disclosed in U.S. Pat. No. 6,335,376. Due to the complex nature of mixed plastic streams from durable goods, it is likely that this method would need to be used in combination with other separation methods.

Froth Flotation is another method to facilitate the separation of plastics of similar density. The method is described in U.S. Pat. No. 6,599,950. Froth Flotation can be used in combination with other separation methods to achieve a desired purity.

Strategies to Recover Additional Plastics from Streams of Durable Goods

Figure 2:
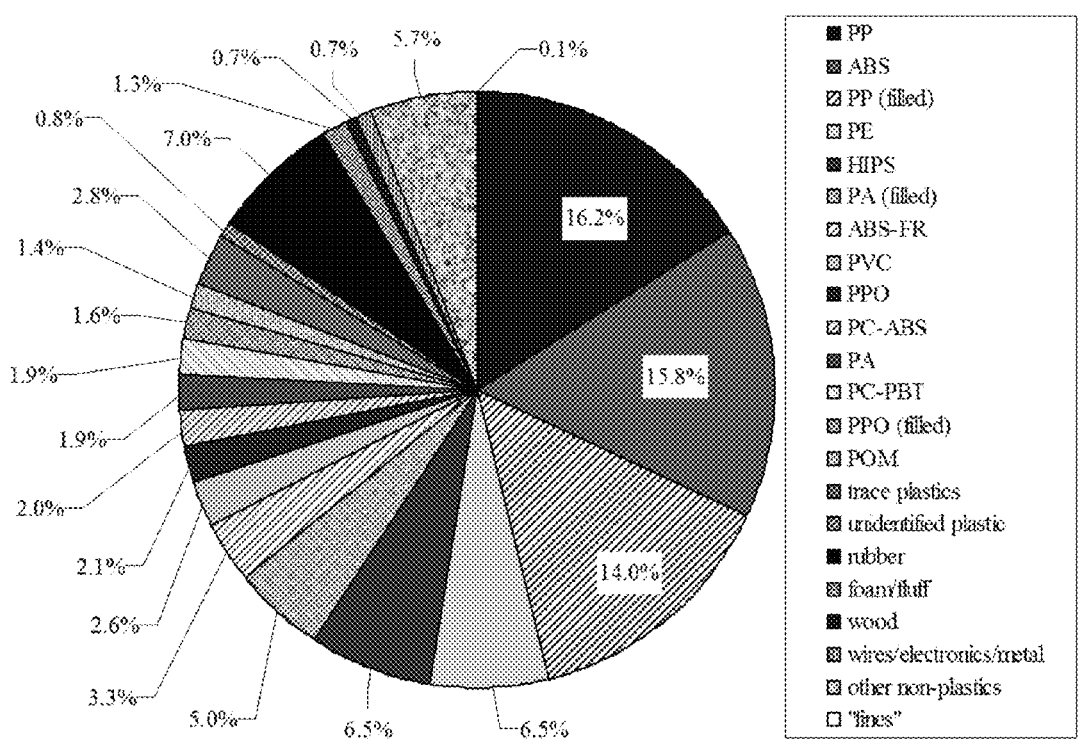
FIG. 2 depicts a typical composition of an upgraded stream of Automobile Shredder Residue (ASR).

Various combinations of the processes described above, along with other known separation processes, can be used to recover plastics from mixed streams from durable goods such as electronics shredder residue (ESR) or automobile shredder residue (ASR). FIGS. 1 and 2 show typical compositions of these streams after upgrading to very high levels of plastic.

Figure 4:
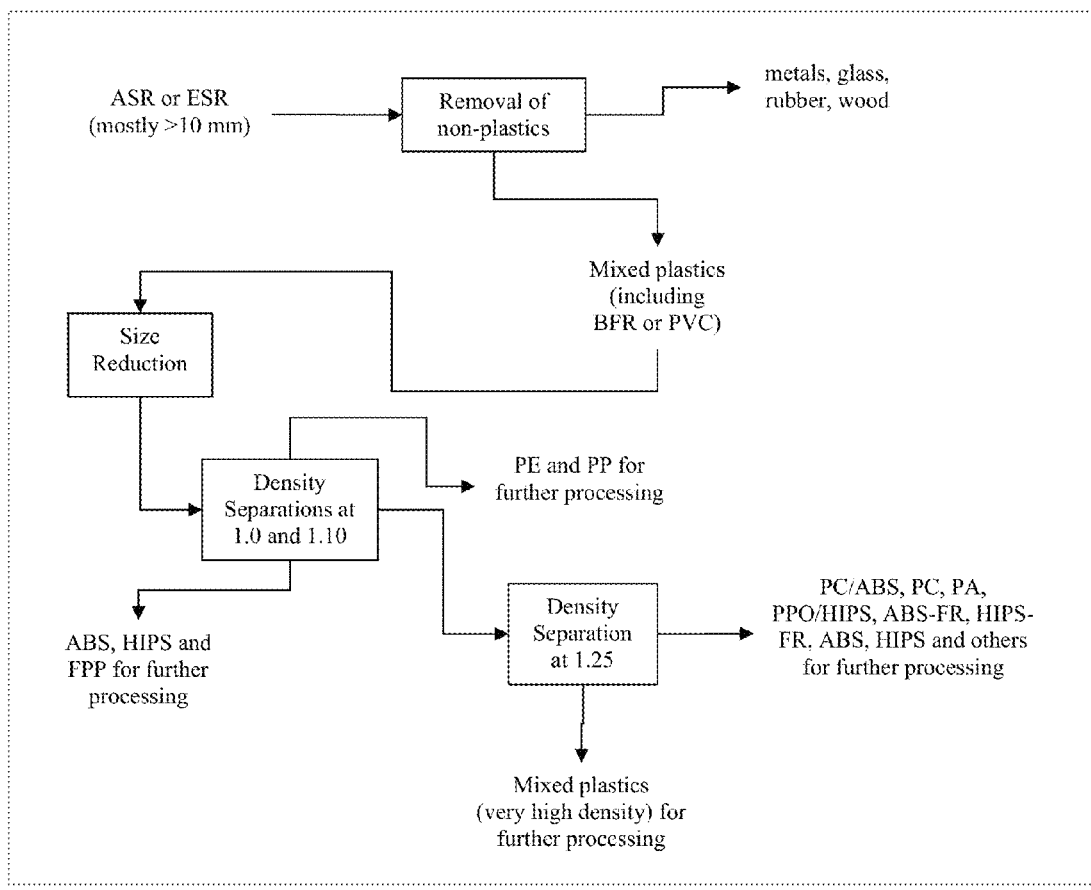
FIG. 4 depicts a process where BFR and non-BFR plastics are separated later in the process.
Figure 5:
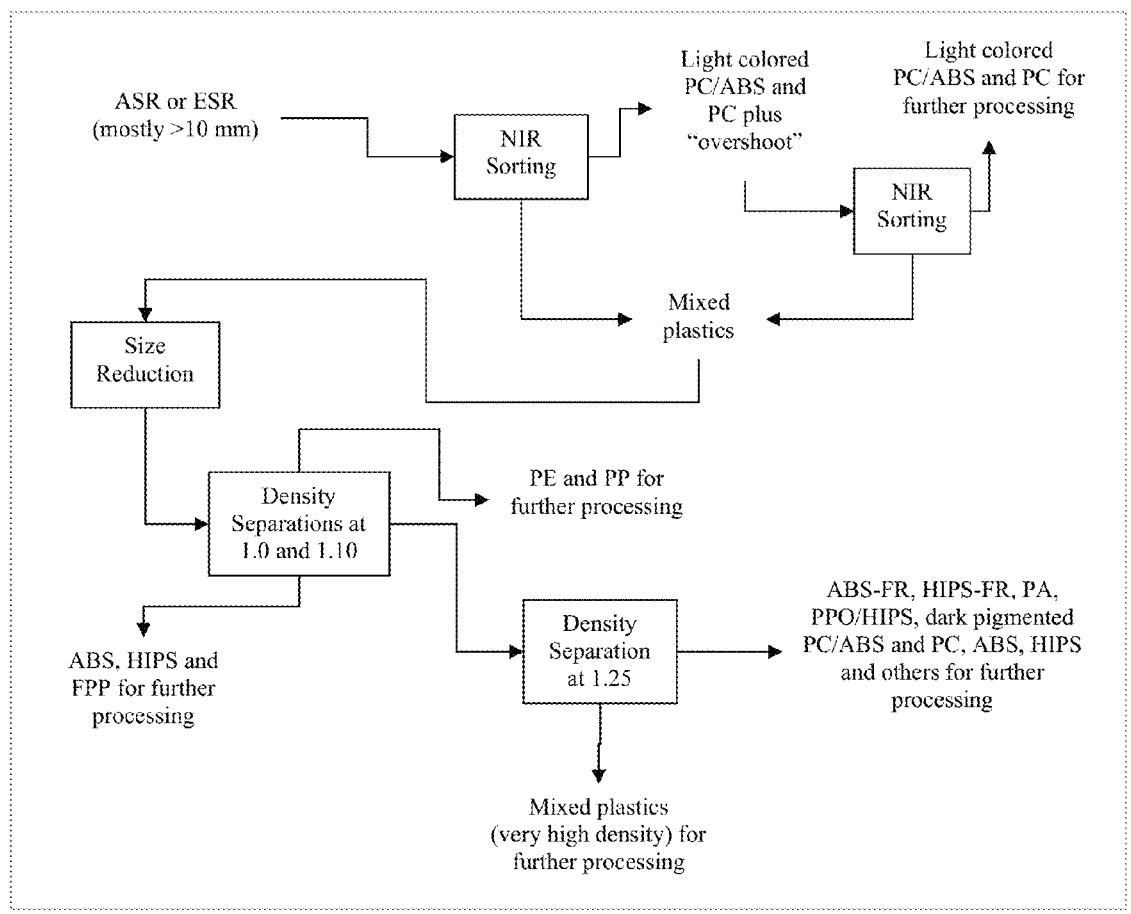
FIG. 5 depicts NIR sorting to create enriched product streams.

Three strategies for the recovery of plastics from ESR or ASR are specifically described herein. These three strategies are shown in FIGS. 3-5 and described below.

The ESR or ASR feed materials to each process primarily consist of plastic pieces larger than about 10 mm in size. The streams also contain small amounts of rubber, wood, metal, wires, circuit boards, foam, glass and other non-plastics.

Figure 3:
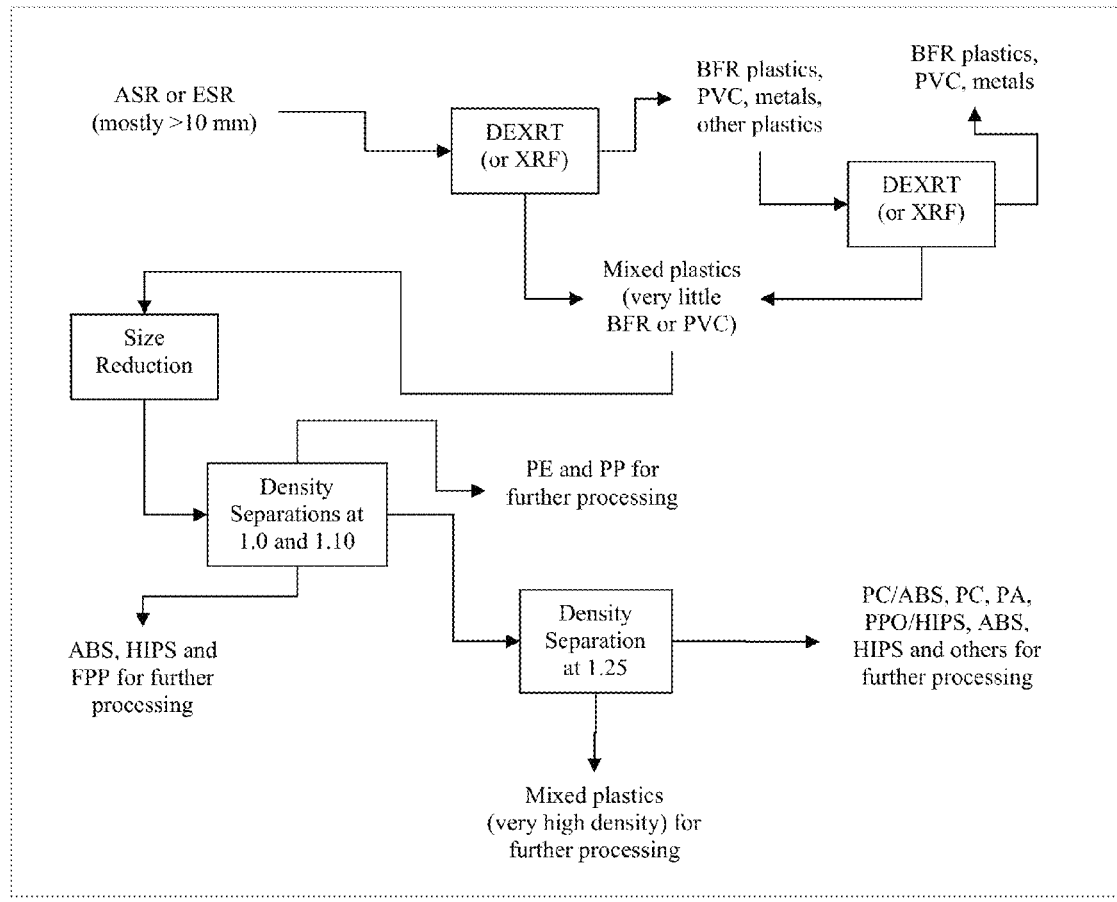
FIG. 3 depicts a utilization of X-ray sorting to create streams with and without BFR.

In the strategy shown in FIG. 3, DEXRT (or XRF) sorting is used early in the process prior to any size reduction steps that would reduce the majority of the particles to sizes smaller than about 10 mm. The sorter is tuned primarily to eject BFR plastics, since these make up a minor portion of the mixture. If XRF sorting is used, it is also possible to remove heavy metal pigmented plastics at this stage. If DEXRT sorting is used, it is likely that the sorting will remove much of the residual metal, circuit boards, PVC and glass in addition to the BFR plastics.

When the BFR plastics (and other dense materials) are ejected, the sorter also will tend to eject particles that are not identified for ejection. These particles are called "overshoot", since they are ejected because they overlap or are too close in proximity to the particles that are identified by the DEXRT for ejection. To minimize losses of these "overshoot" particles, the ejected material can be processed over another DEXRT (or XRF) sorter. In this second sort, particles that are not sufficiently dense or that do not contain Br are ejected and returned to the main stream of mixed plastics.

The mixed plastic stream is then size reduced to under about 10 mm followed by processing through two density separation stages. One density separation stage is in water and yields a mixture of primarily PP and PE as a product for further processing. Another density separation stage is at an elevated density of approximately 1.10. This density is achieved by using salt solutions or particulate suspensions. The low density product from the separation at approximately 1.10 contains mostly ABS, HIPS and FPP, which can be further separated using various methods. The higher density "heavies" product from the separation at approximately 1.10 is a complex mixture of plastics including PC/ABS, PC, PA, PPO/HIPS, PBT, PET and other plastics. The other plastics in the "heavies" can include ABS, HIPS and FPP that incorrectly reported to the stream in the density cut and ABS-FR and HIPS-FR that were not ejected in the DEXRT sorting stage.

To simplify the recovery of some of the primary plastics from the "heavies", the mixture can be further separated in a salt solution or particulate suspension with a density of approximately 1.25. The higher density fraction will contain mostly highly filled PA and FPP, POM, PBT, PC/PBT and thermosets. The lower density fraction from this separation will contain PC/ABS, PC, PA, PPO/HIPS, ABS, HIPS, FPP, rubber and wood. Some of the ABS and HIPS misreported to this density fraction, but can be recovered or incorporated into some of products recovered from this fraction. The lower density fraction might also be small amounts of ABS-FR and HIPS-FR that were not removed in the DEXRT (or XRF) sorting process. Both products can go on to further separations as desired.

In the strategy summarized in FIG. 4, process steps to remove most metal and other non-plastics are used early in the process prior to any size reduction steps that would reduce the majority of the particles to sizes smaller than about 10 mm.

The mixed plastic stream, which contains all types of plastics, is size reduced to under about 10 mm followed by processing through two density separation stages. One density separation stage is in water and yields a mixture of PP and PE as a product for further processing. Another density separation stage is at an elevated density of approximately 1.10. This density is achieved by using salt solutions or particulate suspensions. The low density product from the separation at approximately 1.10 contains mostly ABS, HIPS and FPP, which can be further separated using various methods. The higher density "heavies" product from the separation at approximately 1.10 is a complex mixture of plastics including PC/ABS, PC, PA, ABS-FR, HIPS-FR, PPO/HIPS, PVC, PBT, PET and other plastics.

To simplify the recovery of some of the primary plastics from the "heavies", the mixture can further be separated in a salt solution or particulate suspension with a density of approximately 1.25. The higher density fraction will contain mostly highly filled PA and FPP, PVC, POM, PBT, PC/PBT and thermosets. The lower density fraction from this separation will contain PC/ABS, PC, PA, ABS-FR, HIPS-FR, PPO/HIPS, ABS, HIPS, FPP, rubber and wood. Some of the ABS and HIPS misreported to this density fraction, but can be recovered or incorporated into some of products recovered from this fraction. Both products can go on to further separations as desired.

In the strategy summarized in FIG. 5, NIR sorting is used early in the process prior to any size reduction steps that would reduce the majority of the particles to sizes smaller than about 10 mm. The sorter is tuned primarily to eject light colored PC/ABS and PC plastics, since these make up a minor portion of the mixture. It would also be possible to eject other light color plastics at this stage, but this document focuses on PC and PC/ABS for simplicity.

When the light colored PC and PC/ABS are ejected, the sorter also will tend to eject other types of particles. These particles are called "overshoot", since they are ejected because they overlap or are too close to the particles that are identified for ejection. To minimize losses of these "overshoot" particles, the ejected material can be processed over another NIR sorter. In this second sort, particles that are not identified by NIR as PC or PC/ABS are ejected and returned to the main stream of mixed plastics.

The mixed plastic stream is then size reduced to under about 10 mm followed by processing through two density separation stages. One density separation stage is in water and yields a mixture of PP and PE as a product for further processing. Another density separation stage is at an elevated density of approximately 1.10. This density is achieved by using salt or particulate suspensions. The low density product from the separation at approximately 1.10 contains mostly ABS, HIPS and FPP, which can be further separated using various methods. The higher density "heavies" product from the separation at approximately 1.10 is a complex mixture of plastics including PC/ABS (dark colored), PC (dark colored), PA, ABS-FR, HIPS-FR, PPO/HIPS, PVC, PBT, PET and other plastics.

To simplify the recovery of some of the primary plastics from the "heavies", the mixture can be further separated in a salt solution or particulate suspension with a density of approximately 1.25. The higher density fraction will contain mostly highly filled PA and FPP, POM, PVC, PBT, PC/PBT and thermosets. The lower density fraction from this separation will contain PC/ABS (dark colored), PC (dark colored), PA, PPO/HIPS, ABS, HIPS, FPP, rubber and wood. Some of the ABS and HIPS misreported to this density fraction, but can be recovered or incorporated into some of products recovered from this fraction. Both products can go on to further separations as desired.

The product streams from each of these overall strategies can include mixed plastic streams that can be subject to further purification steps to remove rubber and wood and to separate the plastics by type to achieve the desired composition, e.g., the composition purities described above. Such purification steps are described in further detail below.

Many process details and some possible process steps are omitted from the drawings and descriptions for the sake of clarity, but it is certainly possible to include additional process steps to remove contaminants, to dry materials, to sort materials by size, to clean materials, and others.

The three strategies included a density separation of approximately 1.25 that was included in order to simplify the separation of a very complex mixture. It is possible to omit this step or to use other methods to remove the very dense plastics.

The size reduction step could be omitted from the process as shown if the density separation processes do not require a small particle size. The size reduction, which can be used to facilitate extrusion and some types of separation processes (e.g. electrostatic separation), can be performed later in the process if the density separation methods work with larger particles.

Once the plastics are separated into the intermediate product mixtures of FIGS. 3-5, further steps are used to recover products in the composition ranges described in Table 1. The process steps used to further purify these plastics can include three or more processes including: density separation, processes to remove rubber, processes to remove wood, processes to control the surface to mass distribution, electrostatic separation, sorting suitable for both light and dark pigmented materials (LD), NIR sorting, color sorting, density differential alteration or froth flotation.

The processes to control surface to mass distributions are not covered in the following, but can be used prior to any process that rely on a narrow surface to mass distribution, such as electrostatic separation, density differential alteration or froth flotation.

Figure 6:
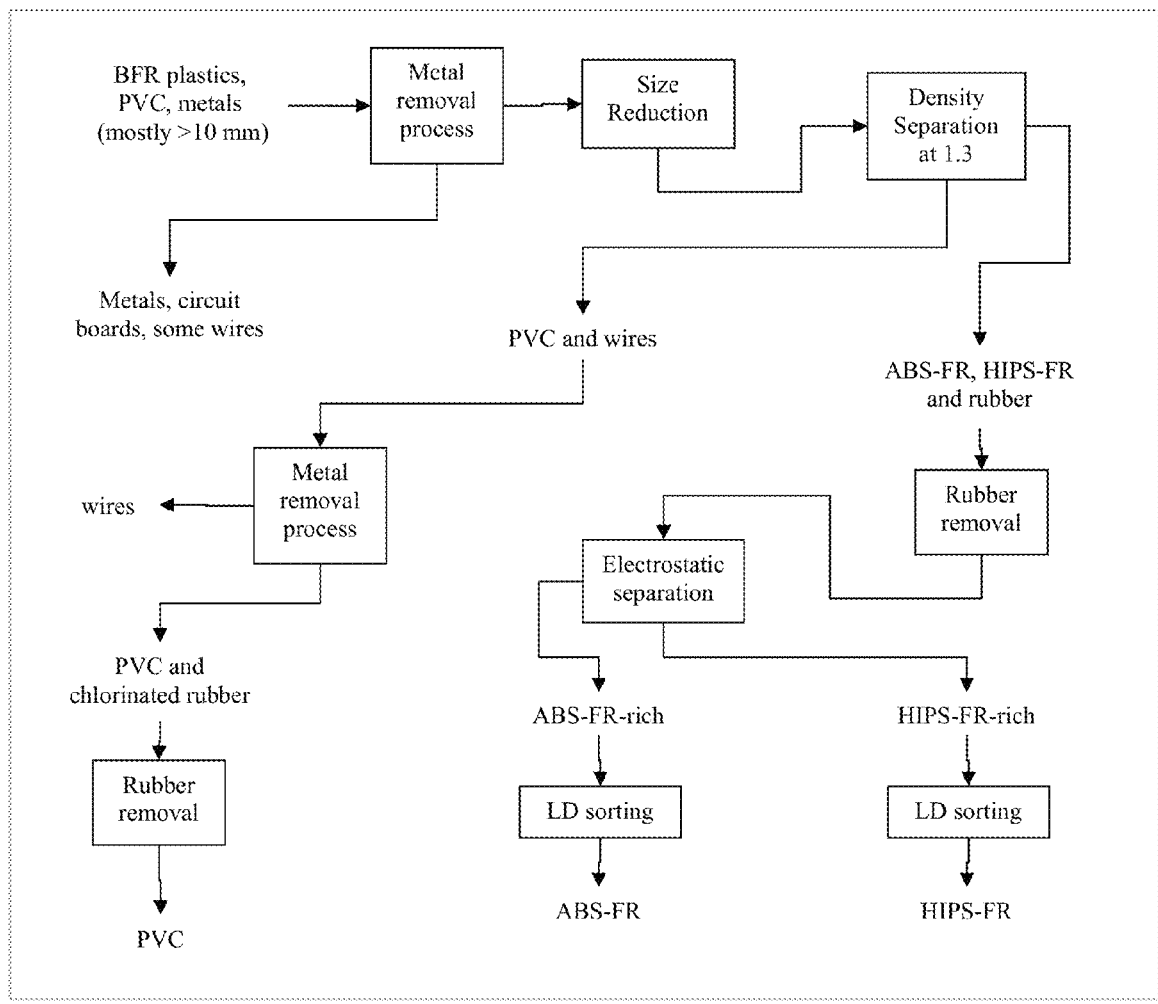
FIG. 6 depicts recovery of ABS-FR, HIPS-FR, PVC and metal-rich products from intermediate product after X-ray sorting.
Figure 7:
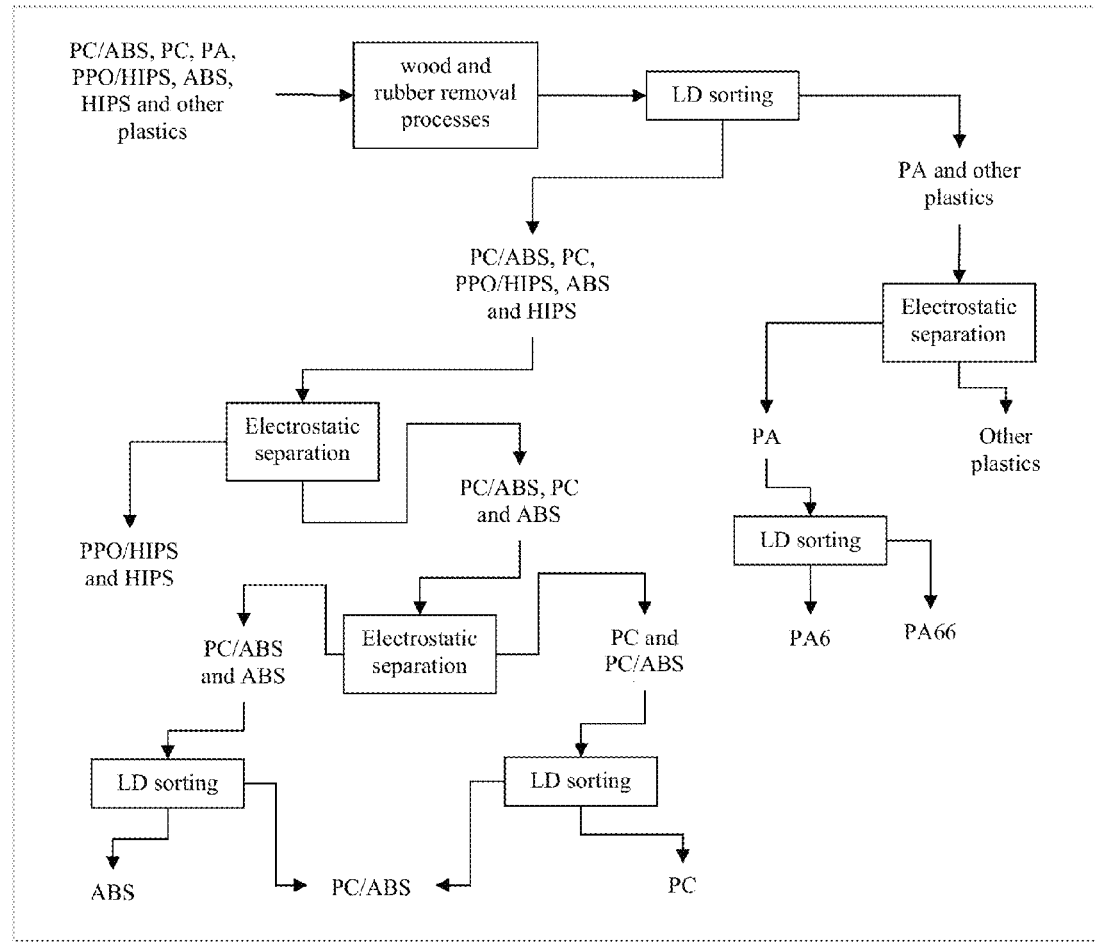
FIG. 7 depicts recovery of PC/ABS, PC, PA and PPO/HIPS products from intermediate product.

To address how these process steps might be used to recover purified plastic streams, FIGS. 6 and 7 provides exemplary methods that can be used recover some of the plastics from the intermediate products from FIG. 3. The five separate intermediate product streams include 1) BFR plastics, PVC and metals; 2) PE and PP; 3) ABS, HIPS and FPP; 4) PC/ABS, PC, PA, PPO/HIPS and other plastics; and 5) very high density mixed plastics.

The intermediate product stream including BFR plastics, PVC and metals can be separated into individual product streams as shown in FIG. 6. As a first step, metals can be removed in a step such as air classification, eddy current separation or a metal detection and ejection. After most of the metals are removed, a size reduction step takes the particle size down below about 10 mm.

These smaller particles, which now include mostly BFR plastics, PVC and small amounts of wires and rubber, can be separated at a density of about 1.3 to recover a "lights" stream rich in ABS-FR and HIPS-FR and a "heavies" stream rich in PVC and some wires.

The "heavies" stream from FIG. 6 can be processed over another metal removal process such as elutriation, a Humphrey spiral or a water table to produce a wire-rich product and a PVC-rich product. The PVC-rich product, which also can contain small amounts of chlorinated rubber, is processed through a rubber removal step to recover a PVC product. This rubber removal process can include an electrostatic separator, an inclined chute sorter as described in U.S. Patent Publication No. 2012-0248014, or the rubber separation processes described in U.S. Pat. No. 8,056,728.

The intermediate product streams of PP and PE and of ABS, HIPS and FPP can be separated as described in U.S. Pat. No. 7,802,685.

The intermediate product stream containing PC/ABS, PC, PA, PPO/HIPS, ABS, HIPS and other plastics can be separated into individual products as shown in FIG. 7. As a first step, the PA and other plastics, which make up a minority of the mixture, can be separated from the remaining plastics using sorting methods suitable for both light and dark pigmented materials (LD). LD sorters can utilize sensors based on high speed laser spectroscopy, for example.

The stream ejected by the LD sorter should contain PA and other plastics. This ejected stream can be processed using an electrostatic separator to obtain a stream containing PA and a stream containing the other plastics. The stream containing PA can be further separated in an LD sorter into PA6 and PA66 products.

The stream from which the PA and other plastics have been removed now contains PC/ABS, PC, PPO/HIPS, ABS and HIPS. This mixture can be processed through one or more stages of electrostatic separation to yield a product containing HIPS and PPO/HIPS which can be compounded without further separations.

The second product from the electrostatic separation contains PC/ABS, PC and ABS. This mixture requires further separation, so can be separated into components using a combination of electrostatic separation and LD sorting. FIG. 7 shows how the mixture can be first sorted into a stream of ABS and PC/ABS and another stream of PC and PC/ABS using electrostatic separations. Each of these products can be further sorted using LD sorting to achieve products with compositions as described in Table 1.

The very high density plastics stream from FIG. 1 can be processed in much the same way as the stream described in FIG. 7, though the details will depend on the actual composition of the mixture.

In addition to the above separation steps, extrusion with melt filtration (and additives to boost properties) is the likely final step for the recovered products.

The process strategies to recover individual plastics from ASR and ESR streams are not limited to the ones described in the above section.

What is claimed:

1. A process for recovering a plastic product mixture from ASR or ESR mixtures, the process comprising process steps for processing a first mixture of materials, the process steps comprising:
    (a) providing the first mixture of materials from ASR or ESR;
    (b) sorting said first mixture using DEXRT, XRF, or a combination thereof, to create a first stream comprising a second mixture and at least one additional stream, the additional stream comprising a third mixture comprising BFR, PVC, metals, or a combination thereof;
    (c) reducing a particle size of at least a portion of the first mixture to form a reduced-size mixture;
    (d) separating at least a portion of said reduced-size mixture at a density of approximately 1.0 to isolate a mixture comprising PP, PE, or a combination thereof;
    (e) separating at least a portion of said reduced-size mixture at a density of approximately 1.10 to isolate a mixture comprising ABS, HIPS, and FPP; and
    (f) separating at least a portion of said reduced-size mixture at a density of approximately 1.25 to create a higher density fraction comprising highly filled PP, POM, PVC, PBT, PC/PBT, thermosets, or a combination thereof, and to isolate a lower density fraction comprising PC/ABS, PC, PA, or a combination thereof.

2. The process of claim 1, wherein reducing a particle size of said second mixture comprises reducing the particle size therein to an average particle size of less than 10 mm.

3. The process of claim 2, wherein reducing the particle size of at least a portion of the first mixture comprises reducing the particle size of the said second mixture occurs after the sorting using DEXRT, XRF, or a combination thereof.

4. The process of claim 1, further comprising processing the lower density fraction comprising PC/ABS, PC, PA, PPO/HIPS, ABS, HIPS, FPP, rubber, wood, or a combination thereof to recover one or more products based on PC/ABS, PC, PA and PPO/HIPS comprising:
- removing wood and rubber;
- LD sorting to separate PA from PC/ABS, PC, PPO/HIPS, ABS, HIPS, FPP, rubber, wood, or a combination thereof;
- electrostatically separating at least a portion of the lower density fraction to create a second stream containing primarily PPO/HIPS and HIPS and a third stream containing primarily PC/ABS, PC and ABS;
- electrostatically separating at least a portion of the third stream to create a fourth stream containing primarily PC/ABS and ABS and a fifth stream containing primarily PC/ABS and PC;
- LD sorting to separate PC/ABS from PC;
- LD sorting to separate PC/ABS from ABS; or
- LD sorting to separate PA6 from PA66.

* * * * *